United States Patent [19]

Napoli

[11] Patent Number: 5,257,502
[45] Date of Patent: Nov. 2, 1993

[54] FUEL DELIVERY SYSTEM FOR DUAL ANNULAR COMBUSTOR

[75] Inventor: Phillip D. Napoli, West Chester, Ohio

[73] Assignee: General Electric Company, Cincinnati, Ohio

[21] Appl. No.: 993,483

[22] Filed: Dec. 18, 1992

Related U.S. Application Data

[63] Continuation of Ser. No. 744,200, Aug. 12, 1991, abandoned.

[51] Int. Cl.⁵ .................................................. F02C 7/22
[52] U.S. Cl. .......................................... 60/739; 60/747
[58] Field of Search .................. 60/39.36, 39.826, 733, 60/734, 739, 746, 747, 39.141

[56] References Cited

U.S. PATENT DOCUMENTS

| | | |
|---|---|---|
| 3,750,396 | 8/1973 | Tucker . |
| 3,774,851 | 11/1973 | Simmons . |
| 3,775,975 | 12/1973 | Stenger et al. . |
| 3,949,775 | 4/1976 | Cornell . |
| 4,194,358 | 3/1980 | Stenger ............................ 60/39.826 |
| 4,246,258 | 1/1981 | Carvel et al. ......................... 60/747 |
| 4,402,184 | 9/1983 | Faulkner et al. ...................... 60/739 |
| 4,411,137 | 10/1983 | Pearce .................................... 60/739 |
| 4,467,610 | 8/1984 | Pearson et al. . |
| 4,499,735 | 2/1985 | Moore et al. . |
| 4,590,768 | 5/1986 | Halvorsen et al. . |
| 4,735,052 | 4/1988 | Maeda et al. ......................... 60/733 |
| 4,817,389 | 4/1989 | Holladay et al. ..................... 60/739 |
| 4,903,478 | 2/1990 | Séto et al. ............................. 60/746 |
| 4,920,940 | 5/1990 | Shekleton ............................. 60/739 |
| 5,054,280 | 10/1991 | Ishibashi et al. ...................... 60/747 |

OTHER PUBLICATIONS

Journal of Propulsion and Power. vol. 3, No. 2, Mar. 1987, New York US, pp. 179-186 D. W. Bahr "Technology for the Design of High Temperature Rise Combustors".

*Primary Examiner*—Louis J. Casaregola
*Attorney, Agent, or Firm*—Jerome C. Squillaro; James P. Davidson

[57] ABSTRACT

A fuel delivery system for a dual annular combustor having a pilot stage manifold, a first main stage manifold, and a second main stage manifold which are connected to a three-position staging valve. The staging valve is controlled by a fuel/air digital electronic control (FADEC) which directs the staging valve to a closed (staged) position, to a partially open (partially staged) position, or to an open (unstaged) position in accordance with a staging-valve-fuel-to-air-ratio control schedule.

10 Claims, 5 Drawing Sheets

FUEL DELIVERY SYSTEM FOR DUAL ANNULAR COMBUSTOR

This application is a continuation of application Ser. No. 07/744,200, filed Aug. 12, 1991 (Abandoned).

BACKGROUND OF THE INVENTION

The present invention relates to dual annular combustors such as those used in aircraft gas turbine engines. More particularly, the present invention pertains to an improvement in fuel delivery systems for dual annular combustors. By coordinating a three manifold fuel delivery system with a three position staging valve with fuel/air digital electronic control (FADEC), the present invention realizes improvements in reduced emission levels and improved durability and operability characteristics in dual annular combustors.

A schematic illustration of a prior art dual annular combustor is provided in FIG. 1. A combustor assembly 10 is housed in casing 12. Diffuser 14 delivers pressurized air to the combustor 16 which is provided with multi-hole liners 17. The holes in the liners provide a means for circulating air to cool the liners as the combustor becomes very hot during operation. Air passages 33A and 33B provide a path for the cooler air from the diffuser to circulate about the combustor.

The majority of compressed air from the diffuser enters the forward area of the combustor. This forward area of the combustor is comprised of a pilot dome 22 and a main dome 24 which are separated or divided by center body 34 to accommodate a pilot stage area 26 and a main stage area 28. Domes 22 and 24 are arranged in a double annular configuration wherein the two form the forward boundaries of what are separate, radially spaced annular combustors, i.e., pilot stage area 26 and main stage area 28. A cowl is located to the front of center body 34 and further serves to demarcate the pilot dome from the main dome.

The domes are connected to the liners 17 by bolts or the like. Disposed in the domes 22 and 24 are carburetor devices 31A and 31B, respectively, which house fuel cups and swirlers. The fuel cups and swirlers are spaced in a circumferential manner at the front area of the combustor 16. The fuel cups of the pilot stage are located radially outward from the fuel cups of the main stage. Fuel is supplied to the fuel cups by means of fuel nozzle 19 which is comprised of dual nozzle inlets 20A and 20B. Nozzle inlet 20A supplies fuel through fuel nozzle stem 18 to pilot dome 22 and nozzle inlet 20B supplies fuel through fuel nozzle stem 18 to main dome 24.

FIG. 2 is a partial frontal, sectional schematic illustration taken along line A—A of FIG. 1. With reference to FIG. 2, fuel from the fuel stem 18 is directed into fuel injectors 21A and 21B and into fuel cups 37A and 37B. The fuel injectors 21A and 21B are slidably disposed in fuel cups 37A and 37B which, as has been mentioned, are housed at a plurality of circumferentially spaced locations around pilot dome 22 and main dome 24. Primary swirlers 30A and 30B are provided for each carburetor device in the pilot and main domes and surround the fuel injectors and fuel cups to provide swirled air which is mixed with the fuel. The products resulting from the combustion of fuel and air exit the pilot and main stage and expand through a downstream turbine section 36 (FIG. 1).

Over the years, environmental and competitive market place considerations have intensified the need to reduce the level of aircraft gas turbine engine emissions. The dual annular combustor offers an advantage over the traditional single annular combustor because the two separately fueled domes of the dual annular combustor allow a reduction in hydrocarbon (HC) and carbon monoxide (CO) emissions which are typically more prevalent at low power operation. Furthermore, the dual annular design achieves a reduction in oxides of nitrogen ($NO_x$) and smoke emissions at high power operation.

The above-described characteristics are achieved by exclusively utilizing the pilot dome during times of low energy requirements such as start-up and idle and utilizing the main dome and pilot dome as further power is necessitated. The main dome receives more and more fuel as the power needs increase. The characteristics are further achieved by enriching the fuel air ratio (F/A) of the pilot dome which is fired during starting and low power operation, and leaning the F/A of the main dome during high power operation.

These opposing low power/high power F/A requirements for achieving lower emission levels are virtually impossible to attain with a fixed geometry, single annular design. For this reason, the single annular combustor design is a compromise between achieving low HC and CO emissions along with good starting and lean blowout operability characteristics at low power and achieving high $NO_x$ emissions, smoke and non-optimum pattern and profile factor at high power. The dual annular combustor concept allows optimization at both ends of the power spectrum.

A schematic of a conventional dual annular combustor fuel delivery system is presented in FIG. 3. Fuel control 40 directs fuel to modulating staging valve 42, which, when opened, allows fuel to be directed to main stage manifold 44. Valve 42 is modulated by positioning it in an "ON" or "OFF" position. When valve 42 is closed, fuel can only enter pilot stage manifold 46. Manifold 46 receives a measure of fuel whether the valve 42 is opened or closed. In conventional dual annular combustors, fueling of the main stage has been dependent on the position of the staging valve, such as staging valve 42, which is typically hydraulically controlled.

FIG. 4 provides a comparison of the dome swirler ϕ ratio (i.e., equivalence ratio) for a single annular combustor 50 and a conventional dual annular combustor 52 at varying levels of thrust and dome swirler ratios. The ϕ ratio is defined as the actual FAR divided by the stoichiometric FAR. The dome swirler ϕ ratio is the actual fuel to air ratio in a dome cup divided by the stoichiometric fuel to air ratio for the fuel used. The graph depicted in FIG. 4 illustrates a staged area of operation 48 and an unstaged area of operation 49. Staged area 48 corresponds to those levels of thrust in which the pilot stage of the combustor is engaged, only. After the thrust level has reached approximately 15%, the main stage begins to receive fuel in increased amounts as power requirements necessitate.

Indicated in FIG. 4 are the four engine operating points which are used to measure the overall emission characteristics of the engine. Operating point A is the 7% of thrust idle position, operating point B is the 30% of thrust approach position, operating point C is the 85% of thrust climb position, and operating point D is the 100% of thrust take-off position.

Superimposed on these data are the relative emission differences at the four engine operating points used to measure the overall emission characteristics of the engine (i.e., 7% idle, 30% approach, 85% climb, and 100% takeoff). With the current fuel delivery concept, significant improvements in emissions are achieved at all test points except 30% approach.

The differences in emission capability at the 30% of thrust as shown in FIG. 4 for a dual annular combustor having a conventional fuel delivery system is due to the selection of the transition point between staged (unfueled main stage) and unstaged (fueled main stage) combustion. To achieve a smooth and efficient transition which is externally non detectable, sufficient fuel must be delivered to the pilot and main stages at transition to prevent flameout of the pilot stage and to allow instantaneous ignition of the main stage. From this view point, the transition point should be set at the highest possible fuel air ratio (F/A) that will meet these requirements. On the other hand, selection of too high a transition F/A could result in hot section component life reduction due to the peaked outboard temperature profile generated by the pilot stage during staged combustion. From this viewpoint, the transition point between staged and unstaged combustion should be set at the lowest possible overall F/A. The resultant transition point is therefore a compromise between these two extremes. In the case of the system used heretofore, the optimum transition point is lower than the 30% approach power point. This results in an overall fuel air ratio at 30% approach that is leaner than desired.

Another drawback to the current two manifold dual annular fuel delivery system is that there is no practical way to fuel the main stage during start transients without flameout of the pilot stage. Flameout is defined as too little fuel to support combustion for a given amount of air. Fueling the main stage during the start transient is desirable since it would reduce the pilot stage peaked outboard exit temperature profile and reduce overall time to idle. The level of minimum fuel flow during starts is incompatible with dome air flows such that the resulting F/A's are not high enough to support combustion in the pilot stage and ignite fuel in the main stage.

Referring back to FIG. 4, line 52 represents the pilot stage of a conventional dual annular combustor during the staged operation of the system. During steady state staged operation, lower levels of HC and CO emissions occur with the dual annular combustor at line 52 than with the single annular combustor represented at line 50. Further, the dual annular combustor provides higher and therefore less desirable P&P (pattern and profile temperature factors) than the singular annular combustor at thrust levels less than 15%. (The P&P relates to the maximum temperature and its location existing at the combustor exit plane and therefore correlates with the life expectancy of engine components located in that vicinity.)

At thrust levels from 45% to 100%, the dual annular combustor represented by line 58 (pilot stage) and line 60 (main stage) achieves lower $NO_x$ and smoke levels when compared to the single annular combustor (line 50) while maintaining equivalent P&P. Further, the dual annular combustor provides higher combustor outlet temperature profile and pattern factors than the single annular combustor at thrust levels below 15%.

It is at thrust levels from 15% to 45% that the single annular combustor has proven superior in lowering HC and CO emissions over the conventional dual annular combustor. With a conventional dual annular system, significant improvements are made over the single annular design at all test points except that of the 30% of thrust approach position. Lines 56 and 54 represent the pilot stage and the main stage, respectively, of a conventional dual annular combustor at thrust levels of 15% to 45%. HC and CO emission levels for the conventional dual annular combustor are greater than that of the single annular combustor (line 50) for this level of thrust. Since approach thrust is an important emission rating point, an increase in HC and CO production at this rating point negatively impacts the achievable amount of emission reduction for the dual annular combustor.

Therefore, a need exists for a dual annular fuel delivery system which achieves a significant improvement in emissions of hydrocarbons and carbon monoxide at the 30% thrust position. Further, a need exists for a dual annular combustor which can fuel the main stage during the start to idle transient without flameout, while providing an acceptable combustor outlet temperature profile and pattern factor, and which reduces the time interval from start to idle power. Also, a need exists to enable partial staging of the combustor during the start to idle transient when fuel flow rates are high in order to improve the combustor outlet temperature profile, while returning to pilot operation only once the idle speed is reached thus achieving low HC and CO emissions.

SUMMARY OF THE INVENTION

Accordingly, among the several objects of the present invention will be noted the provision of a fuel delivery system for a dual annular combustor which achieves significant reductions in HC and CO emissions at the 30% of thrust approach position; the provision of an improved combustor outlet temperature P&P during transient acceleration; a reduction in the time needed to accelerate the engine; and the provision of a fuel system controlled by a simple three position valve.

These and other valuable objects and advantages of the present invention are achieved by a dual annular combustor fuel delivery system having a three-position staging valve which is connected to a hydromechanical unit (HMU) and a FADEC. The FADEC controls the opening and closing of the staging valve by means of the hydromechanical unit.

When closed in a staged position, the staging valve allows fuel to be delivered to a pilot manifold, only. However, in a partially staged position, the valve allows fuel to be supplied to the pilot manifold and a first main manifold. In an unstaged position, the staging valve allows fuel to be supplied to the pilot manifold, the first main stage manifold, and a second main stage manifold. The pilot manifold is connected to all of the fuel cups in the pilot dome of the combustor, the first main stage manifold is connected to half of the fuel cups in the main dome of the combustor and the second main stage manifold is connected to the remaining half of fuel cups in the main dome of the combustor.

The FADEC controls switching of the staging valve during steady state and transient operation by calculating real time fuel air ratio using measured engine parameters and comparing the resultant value to the desired F/A ratio—staging valve position schedule stored in its memory.

BRIEF DESCRIPTION OF THE DRAWINGS

A more complete appreciation of the drawings and many of the attendant advantages thereof will be readily obtained as the same becomes better understood by reference to the following detailed description when considered in connection with the accompanying drawings, wherein.

When referring to the drawings, it is understood that like reference numerals designate identical or corresponding parts throughout the respective figures.

THE DETAILED DESCRIPTION OF THE INVENTION

Figure 5:
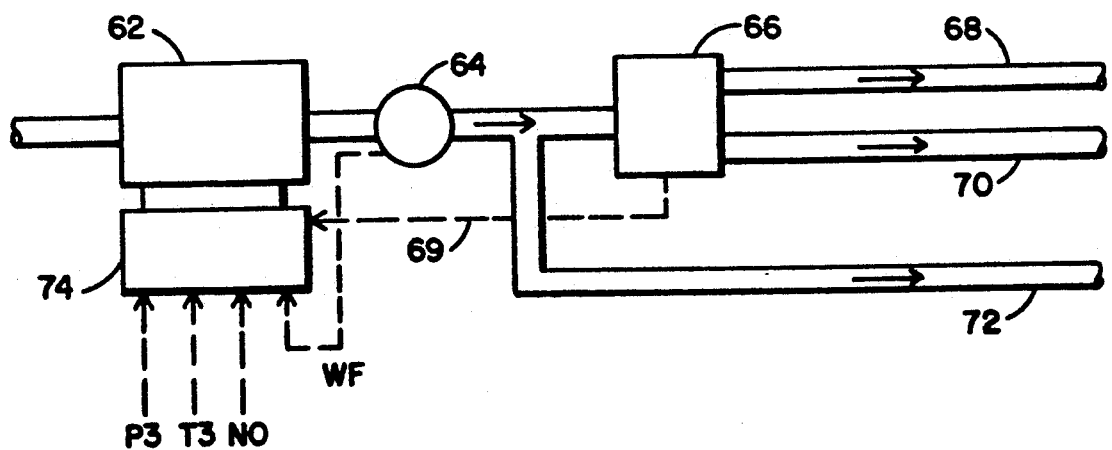
FIG. 5 is a simplified schematic illustration of the fuel delivery system of the present invention.

With reference to FIG. 5, which is a simplified schematic of the fuel delivery system of the present invention, HMU (hydromechaical unit) 62 is connected to a flow meter 64 which is connected to three-position staging valve 66. Staging valve 66 is connected to first main stage manifold 68, to second main stage manifold 70, and to pilot stage manifold 72. Connection line 69 electrically connects the staging valve 66 with the FADEC 74. FADEC 74 receives fuel flow ($W_F$) data from flow meter 64. Compressor discharge pressure (P3) data, compressor discharge temperature (T3) data and core engine speed (N2) data are likewise received by FADEC 74. FADEC 74 is interfaced with HMU 62 and together control the fuel supplied to the combustor.

Figure 6:
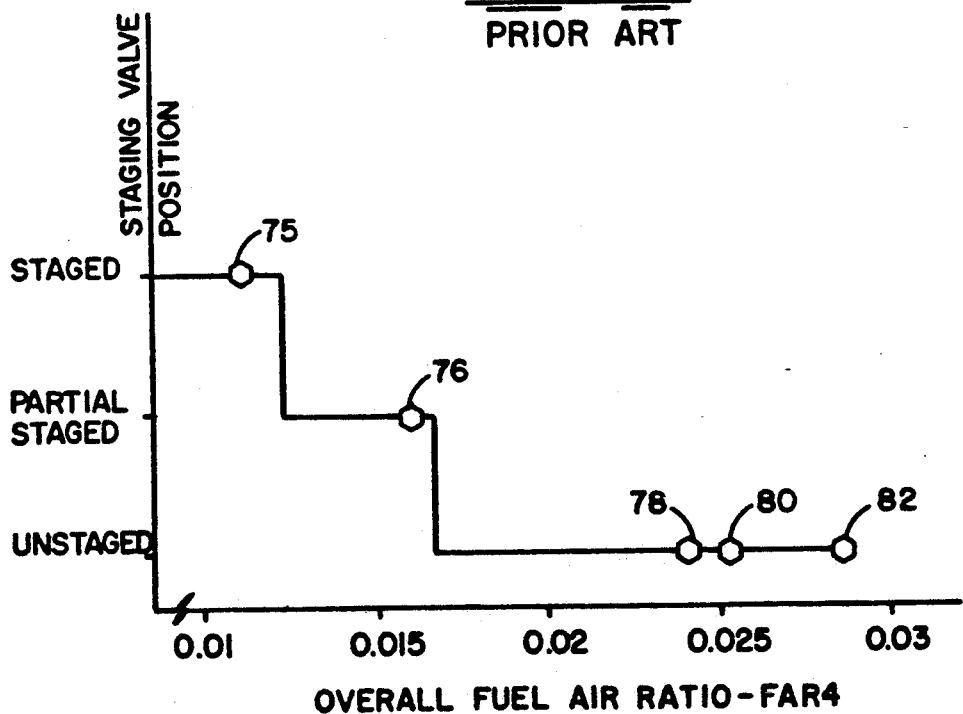
FIG. 6 is a graphical illustration depicting the staging valve control schedule of the present invention for allocating the requisite steady state fuel air ratio for various levels of thrust.

The graph depicted in FIG. 6 compares the steady state fuel air ratio levels for staged, partially staged and unstaged positions of the staging valve 66. The FADEC 74 calculates F/A ratio from the P3, T3 and $W_F$ data. Based upon this calculated fuel air ratio, the position of staging valve 66 is set according to either a steady state or transient schedule of F/A ratio to valve position. Steady state operation is defined as operating at a particular flight setting, e.g., cruise at 35,000 feet (35K) at 0.8 Mach number. By comparison, transient operation is defined as accelerating or decelerating between operating points.

With further reference to FIG. 6, point 75 represents the 7% of thrust idle position. At the 7% thrust idle position, valve 66 is in the staged or closed position which prevents fuel from reaching manifolds 68 and 70. Point 76 represents the 30% of thrust approach position at which the valve 66 is partially staged or open to allow fuel to flow to manifold 68 but not to manifold 70.

Point 78 represents a cruise position, point 80 represents a climb position at 85% of thrust, and point 82 represents a takeoff position at 100% of thrust. When operating at points 78, 80 and 82, valve 66 is in an unstaged or open position which allows fuel to be supplied to both manifold 68 and to manifold 70. As can be appreciated from FIG. 5, whenever manifolds 68 and 70 receive fuel, pilot manifold 72 receives fuel as well.

Figure 7:
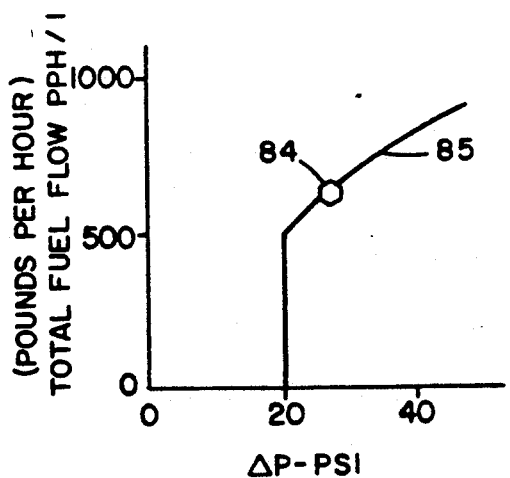
FIG. 7 is a graphical illustration depicting the fuel flow rate needed by the pilot stage fuel nozzles of the present invention in order to start the engine.

FIG. 7 shows the pilot stage fuel nozzle required total fuel flow schedule as a function of fuel nozzle $\Delta P$ in the low fuel flow/engine start regime. Fuel nozzle $\Delta P$ (psi) is defined as the difference in pressures between nozzle inlet fitting 20A and dome static pressure located at 31A. During engine starting, all metered fuel flow is injected into the pilot dome cup through the primary circuit of the pilot stage nozzle. Point 84 on the graph is the minimum fuel flow rate that FADEC 74 and HMU 62 of the present invention are required to supply to pilot manifold 72 for purposes of starting the engine. At point 84, fuel is supplied at a rate of 580 pounds of fuel per hour at a flow number of 4.0 FN TIP (flow number in the tip of the nozzle orifice). The flow number is determined by calculating the fuel flow rate and dividing the fuel flow rate by the square root of the pressure drop across the orifice in the nozzle tip. Line 85 on which point 84 is positioned has a flow number of 4.0 at every point along its length, 4.0 being the flow number of the primary circuit tip orifice in fuel nozzle 19.

Figure 8:
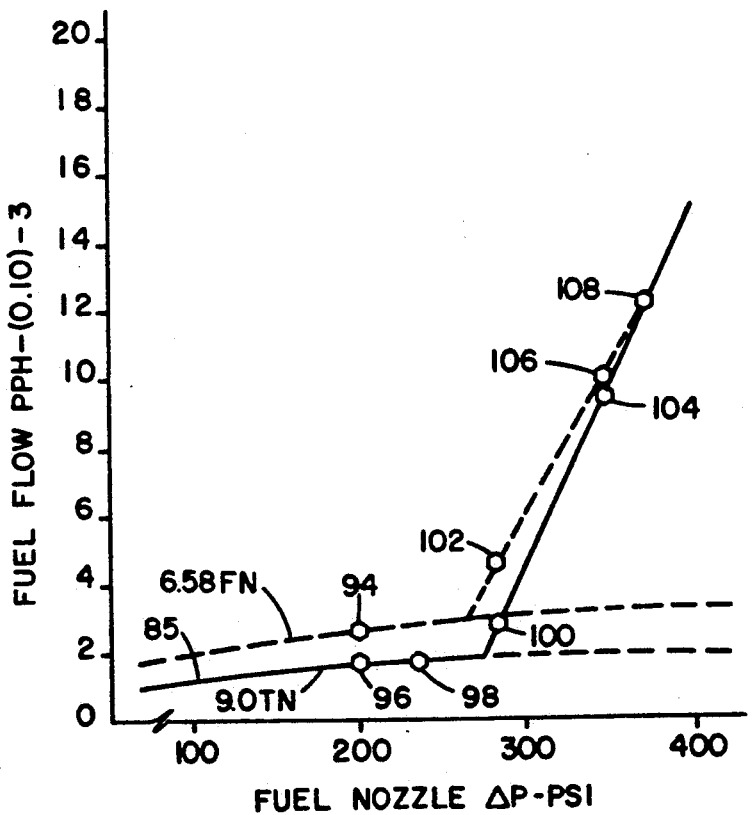
FIG. 8 is a graphical illustration depicting the required pilot stage and main stage fuel nozzle flow schedules required to achieve the desired dome flow splits of the present invention at various levels of engine performance and is to be used in continuation of FIG. 7.

FIG. 8 presents the pilot stage and the main stage fuel nozzle flow schedule as a function of nozzle $\Delta P$ (psi). Each nozzle has an independent primary and secondary flow circuit. The primary circuit is specifically designed for starting and low flow operation while the secondary circuit is employed during high fuel flow operation. The secondary circuit of each main stage and pilot stage nozzle has a flow divider valve that does not permit circuit flow below 270 psi nozzle $\Delta P$. At $\Delta P$ pressures above 270 psi, the flow schedule for each nozzle is a combination of primary flow and secondary circuit flow. At pressures below 270 psi, the flow schedule for each nozzle is strictly primary flow. The design flow numbers for the main stage fuel nozzle and pilot stage primary flow tip orifices are 6.58 and 4.0, respectively. In the present invention, it is important to remember that the ECU controls the quantity of fuel delivered to the engine and directs fuel to the combustor pilot stage and main stage manifold via the position of the staging valve. The function of the fuel nozzle is to distribute the delivered fuel flow to the combustor.

With further reference to FIG. 8, point 94 represents fuel flow rate of the flowing main stage nozzle at 15% power level with partial staging (i.e., the first main manifold 68 supplies fuel to one half of the cups in the main dome, second main manifold 70 not receiving any fuel). Point 96 represents the same operating point as point 94, but indicates fuel flow rate in the pilot stage.

Point 98 is the fuel flow rate in the pilot stage at 7% power level. There is no corresponding point on the main stage line since the combustor is fully staged at the 7% power level (i.e., only the pilot dome cups are ignited). Point 100 on line 85 and point 102 on broken line 90 represents the operating points at the 30% power level (approach setting) at sea level (SL) and also represent the operating points for cruise at 35,000 feet altitude and 0.8 Mach number. Partial staging occurs at points 100 and 102. Hence, point 102 represents the fuel flow rate of the flowing main stage nozzle at 30% sea level thrust. Points 104 and 106 represent the 85% power level operating point at sea level when no staging is present (i.e., all three manifolds are supplying fuel). Point 108 represents the full unstaged 100% power level at sea level.

Figure 1:
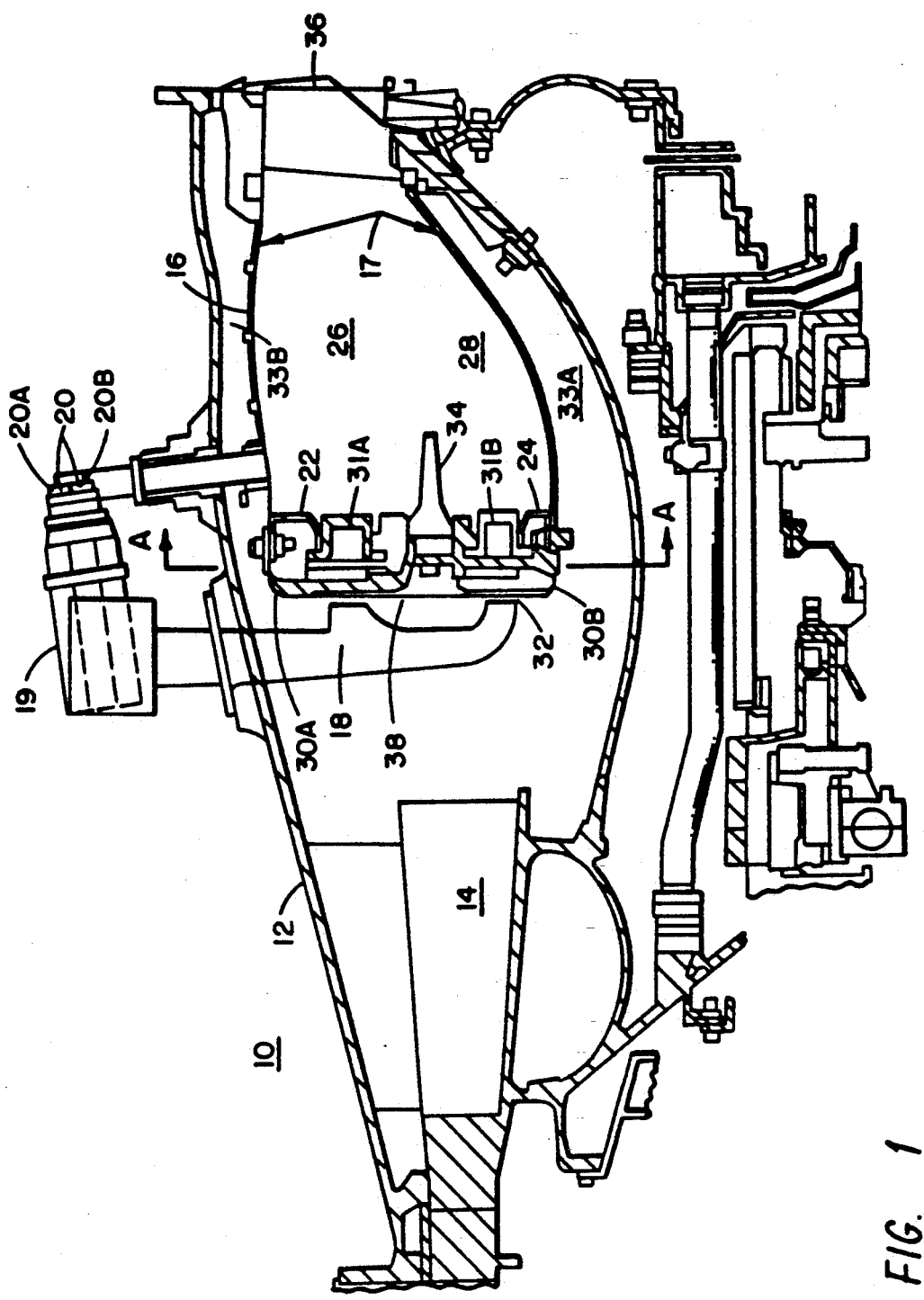
FIG. 1 is a schematic illustration of an exemplary dual annular combustor assembly.
Figure 2:
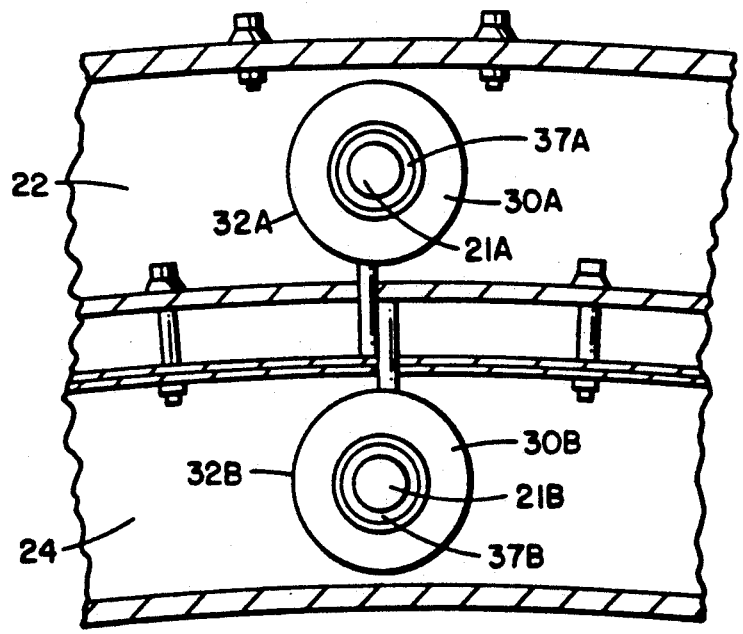
FIG. 2 is front view, partial cross-sectional schematic illustration taken along line A—A of FIG. 1.
Figure 3:
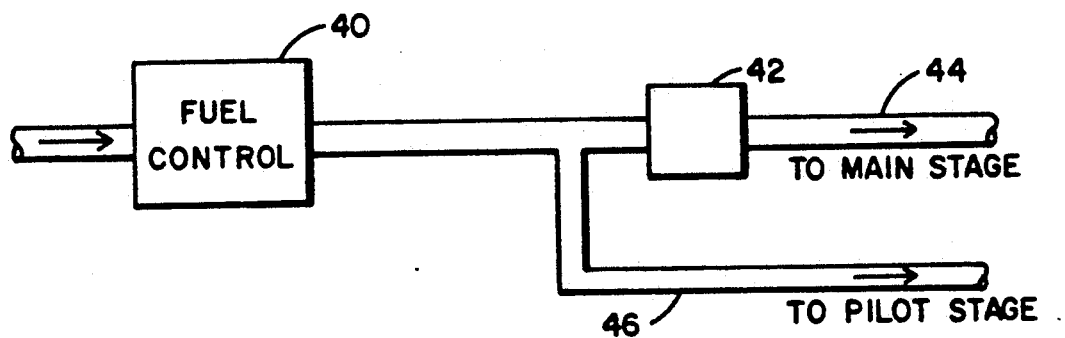
FIG. 3 is a schematic illustration of a prior art dual fuel delivery system.
Figure 9:
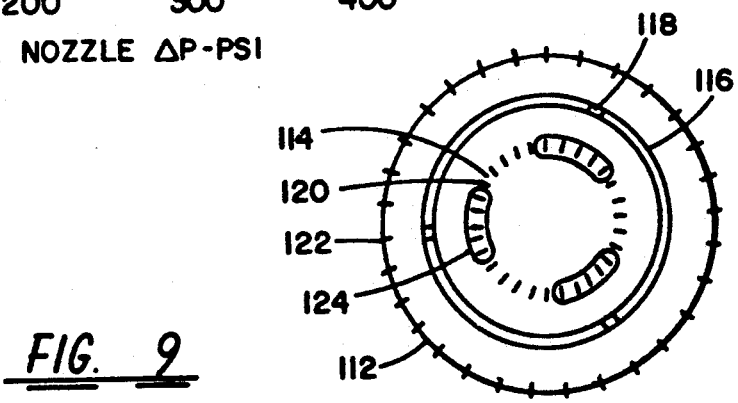
FIG. 9 is a frontal cross-sectional schematic illustration of the fuel manifold and nozzle assembly of the present invention.

With reference to FIG. 9, pilot stage 112 according to the present invention is located radially outward of main stage 114 with the main and pilot stages being separated by dome center body 116 (dome center body 116 corresponding to dome center body 34 of FIG. 1). Main stage 114 is provided with a plurality of fuel cup locations 120 which are fueled in clusters 124 containing five fuel cups. First main stage manifold 68 (FIG. 5) is connected to fifteen fuel cup locations 120 and second main stage manifold 70 is connected to an additional fifteen fuel cup locations 120.

The pilot stage 112 has thirty fuel cup locations 122 which are located radially outward of the main fuel cup locations 114. Fuel cup locations 122 are connected to the pilot manifold 72 (FIG. 5). With further reference to FIG. 9, cross fire holes (three being shown in FIG. 9) are located in the dome center body 116 to allow firing of the main stage from the pilot stage. The cross fire holes are aligned with those main stage fuel nozzle clusters that are normally fueled during partial staging of the main dome. A small number of cross fire holes are desirable since this simplifies construction of the center body 116 and reduces the leakage from the pilot to the main dome thereby reducing unburned hydrocarbons and CO emissions (especially when only the pilot stage is fueled).

Figure 10:
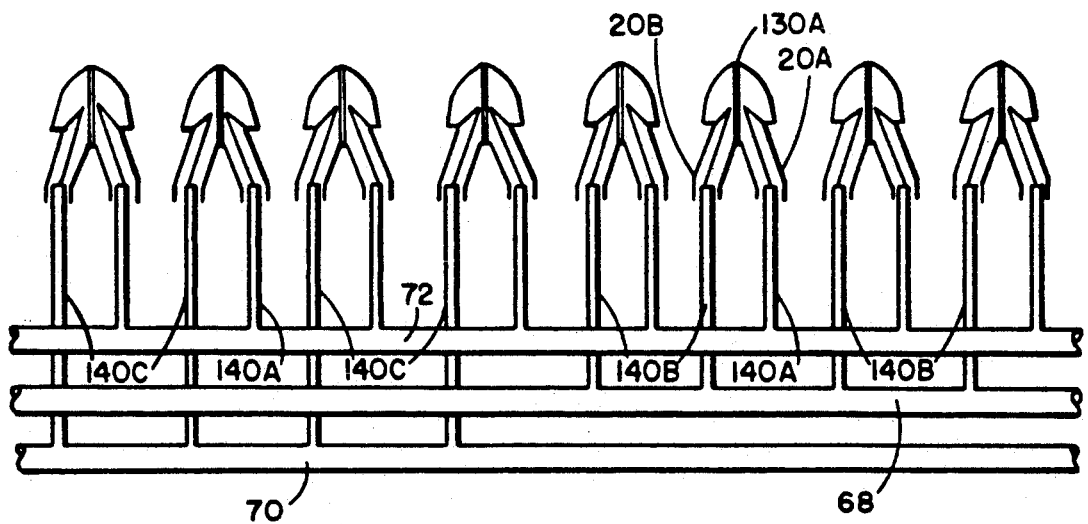
FIG. 10 is a schematic illustration of the fuel nozzle/fuel manifold connection arrangement for the fuel delivery system of the present invention.

With reference to FIG. 10, mounting flanges 130A connect to a fuel nozzle inlet such as inlets 20A and 20B shown in FIG. 1. The mounting flanges are secured to the case surrounding the combustor such as case 12 (FIG. 1). All nozzle inlets 20A are connected to pilot stage manifold 72 via pigtail 140A. Inlet fittings 20B are connected alternately in three groups of five to main stage manifolds 68 and 70 via respective pigtails 140B and 140C. According to the present invention, fifteen piglet tubes connect to first main stage manifold 68 and fifteen piglet tubes connect to second main stage manifold 70. First main stage manifold 68, second main stage manifold 70 and pilot stage manifold 72 are interfaced with a plurality of fuel stems such as fuel stem 18 of FIG. 1 which provide fuel to the fuel nozzle locations depicted in FIG. 9.

The fuel cups in the main dome, such as dome 24, are clustered in groups of five with each cluster 124 of five adjacent fuel cup locations being fed by either first main manifold 68 or second main manifold 70. Each nozzle (such as nozzle 19 of FIG. 1) is therefore connected to the pilot manifold 72 and to manifold 70 or manifold 68. The first and second main manifolds are never connected to the same nozzle.

Figure 4:
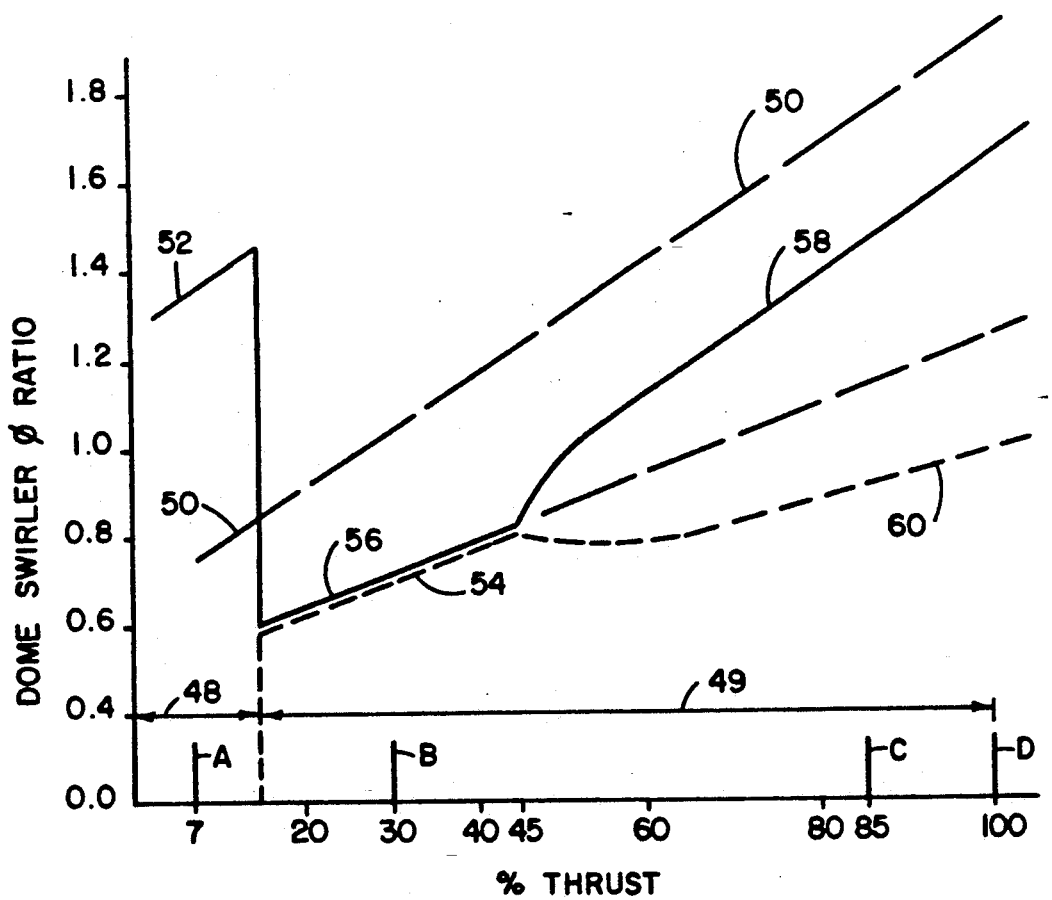
FIG. 4 is a graphical illustration comparing the effectiveness in reducing emissions for prior art single annular combustors and prior art dual annular combustors.
Figure 11:
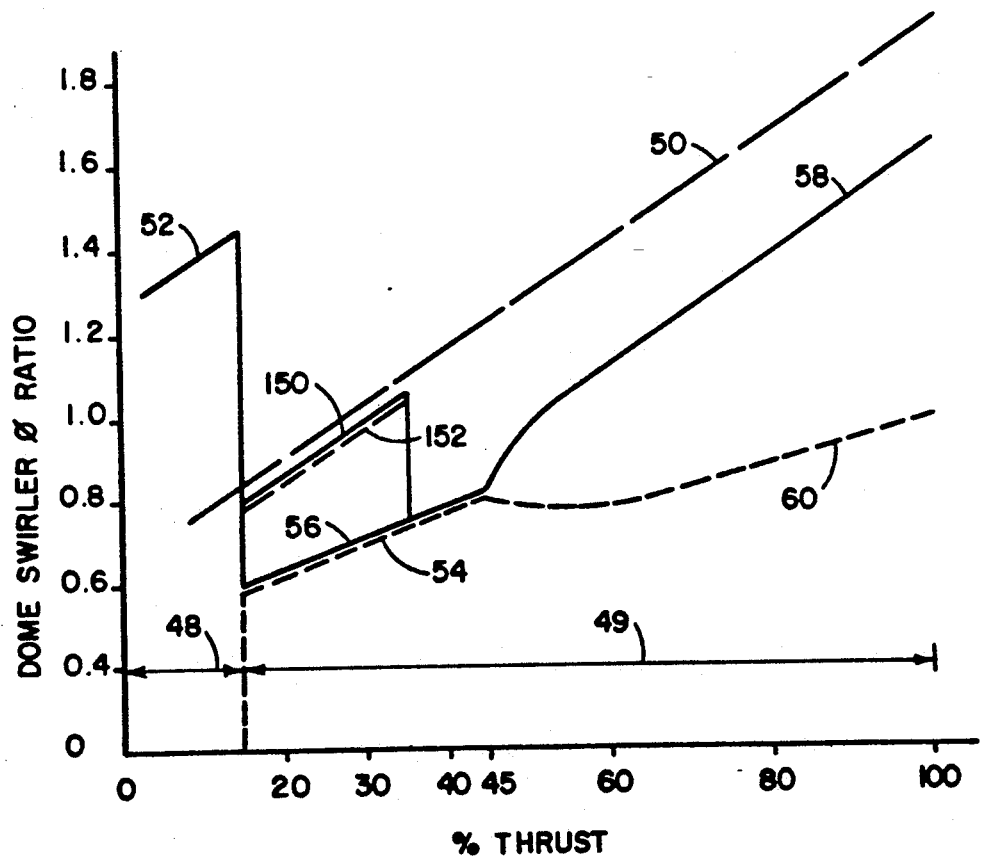
FIG. 11 is a graphical illustration showing the improvement in emission levels achieved by the present invention over prior art singular and dual annular combustors.

With reference to FIG. 11, the graph depicted therein is similar to FIG. 4 with the vertical axis indicating dome swirler ratio and the horizontal axis indicating percentage levels of thrust. By way of example, the stoichiometric ratio for determining the dome swirler ratio for the present invention is about 0.069. In FIG. 11, line 150 represents the pilot stage of the dual annular combustor of the present invention when operating at the 15% to 35% thrust level and line 152 represents the local swirler ratio for the fired cups in the main stage of operation for the same thrust interval. The present invention improves the HC and CO emission levels for the dual annular combustor to levels nearly identical to that of the single annular combustor at the 30% of thrust position.

According to the present invention, the engine may be started by utilizing only the pilot stage. Because the present invention has two main manifolds instead of one main manifold, this allows partial fueling of the main stage during the start transient. Also, since both main and pilot domes are burning during partial staging, less skew is present in the combustor temperature profile and time to idle is reduced.

In prior designs, to get from start to idle speed, the engine was started on the pilot stage and the fuel supply was increased to the pilot stage until the idle speed was reached. No burning was present in the main dome in going from start to idle, since for the relatively low fuel flow level needed for idle, the fuel air ratio would be too lean to support combustion. This is due to the fact that for prior art dual annular combustors the fuel flow rate at the idle operating point is too low to support proper combustion if the fuel is divided between all the fuel cups on the pilot and main domes. Therefore, to reach the idle point, prior art dual annular combustors burn only the pilot stage which results in a very highly skewed combustor temperature profile. The resulting high temperatures may cause damage to downstream turbine hardware during the start transient.

As previously mentioned, the present invention uses partial staging for accelerating from start to idle. This necessitates increasing the fuel flow rate from 580 pounds of fuel per hour to approximately 1700 pounds of fuel per hour. As previously mentioned, the engine is started by using the pilot stage only. Then as the engine goes from the start to the idle position, partial staging results in all of the fuel cells in the pilot stage and half the fuel cells in the main stage being lit. Thus, the present invention provides a fuel air ratio sufficient to support combustion during the start transient while improving temperature profile. When steady state idle is achieved, the staging valve diverts all fuel to the pilot stage for low steady state emission operation.

The present invention through the use of HMU 62, FADEC 74 and control valve 66 allow fuel flow to be controlled so that a desired amount of fuel is supplied to first main manifold 68, second main manifold 70 and pilot manifold 72. A hydraulic circuit (not shown) in the HMU 62 is used to physically control the positioning of control valve 66 so that the combustor will operate in a staged, partially staged or unstaged mode of operation. The FADEC 74 controls the operation of HMU 62 with FADEC 74 being provided with memory and calculation means for achieving optimum fuel flow rates and their corresponding fuel air ratios for the desired level of operation.

The improved fuel delivery system of the present invention simplifies control of the staging valve 66 in that the valve does not require full area modulation in order to control the pilot and main dome flow splits.

This is accomplished because the three-position staging valve 66 is controlled by FADEC 74 which is programmed to accommodate the optimal fuel air ratio for every desired thrust level of engine operation.

Once the valve position is set, the flow splits between the pilot dome and main dome are controlled by the schedule shown in FIG. 8 which is made a part of the memory FADEC 74. The fuel nozzles (e.g., nozzle inlets 20A and 20B) distribute the flow between the pilot and main domes. As those skilled in the art recognize, fuel nozzles can be designed and provided to achieve the flow split shown in FIG. 7 and FIG. 8.

Further, the three-position staging valve 66 of the present invention is much less complex than the fully modulated valves of the prior art. A solenoid valve and switch in the staging valve 66 removes the need for cumbersome mechanical hardware. By contrast, prior art valves typically use linear velocity displacement transducer (LVDT) feedback to an electronic control unit connected to a torque motor power drive.

Staging valve 66 in being controlled to accommodate an optimal fuel/air ratio as a result of its interface with FADEC 74 provides desired fuel scheduling and distribution while optimally reducing emissions and achieving overall improvement in the operability and durability of the engine system.

The foregoing detailed description is intended to be illustrative and non-limiting. Many changes and modifications are possible in light of the above teachings. Thus, it is understood that the invention may be practiced otherwise than as specifically stated herein and still be within the scope of the appended claims.

What is claimed is:

1. A dual annular combustor fuel delivery system for a gas turbine engine having a pilot stage and a main stage, said system comprising:
   a pilot stage manifold connected for delivering fuel to the pilot stage;
   a first main stage manifold connected for delivering fuel to the main stage;
   a second main stage manifold connected for delivering fuel to the main stage; and
   control valve means coupled in operative relationship with each of said pilot stage manifold, said first main stage manifold and said second main stage manifold, said means controlling the flow of fuel to each of said manifolds.

2. A system according to claim 1 further comprising:
   valve control means for operating said control valve means in a staged position, in a partially staged position, and in an unstaged position.

3. A system according to claim 2 wherein said valve control means is a hydromechanical unit.

4. A system according to claim 2 further comprising:
   electronic control means connected to said valve control means for controlling fuel flow to said pilot manifold, to said first main manifold, and to said second main manifold according to a staging-valve-fuel-to-air-ratio control schedule.

5. A system according to claim 4 wherein said electronic control means is a FADEC.

6. A system according to claim 1 further comprising:
   a plurality of fuel cup locations connected to the pilot stage;
   a first half of said fuel cup locations and a second half of said fuel cup locations connected to the main stage; and
   wherein said pilot manifold is connected to said plurality of fuel cup locations connected to the pilot stage, said first main stage manifold is connected to said first half of fuel cup locations connected to the main stage, and said second main stage manifold is connected to the second half of fuel cup locations connected to the main stage.

7. A system according to claim 6 wherein:
   said first half of fuel cup locations is comprised of a plurality of clustered fuel cups.

8. A system according to claim 7 wherein:
   said second half of fuel cup locations is comprised of a second plurality of clustered fuel cups.

9. A system according to claim 1 wherein the main stage and pilot stage are connected to and separated by a center body, said center body comprising:
   means for reducing unburned hydrocarbons and CO emissions.

10. A system according to claim 9 wherein said means for reducing comprises three cross fire holes in said center body.

* * * * *